United States Patent [19]

Davis et al.

[11] Patent Number: 4,855,830

[45] Date of Patent: Aug. 8, 1989

[54] MACHINE VISION SYSTEM WITH ILLUMINATION VARIATION COMPENSATION

[75] Inventors: Wesley Davis, Franklin; Michael L. Gasperi, Caledonia, both of Wis.

[73] Assignee: Allen-Bradley Company, Inc., Milwaukee, Wis.

[21] Appl. No.: 31,414

[22] Filed: Mar. 30, 1987

[51] Int. Cl.$^4$ .................. H04N 5/57; H04N 17/04
[52] U.S. Cl. ................... 358/168; 358/10; 358/101; 358/139
[58] Field of Search ............. 358/168, 139, 10, 160, 358/161, 174, 171, 164, 101

[56] References Cited

U.S. PATENT DOCUMENTS

| | | | |
|---|---|---|---|
| 3,568,151 | 3/1971 | Majima | 340/146.3 |
| 3,670,100 | 6/1972 | Briggs et al. | |
| 3,790,706 | 2/1974 | Gubala et al. | |
| 3,903,357 | 9/1975 | Woolfson et al. | |
| 4,000,366 | 12/1976 | Sirrine | 358/171 |
| 4,101,927 | 7/1978 | Isono | 358/168 |
| 4,485,394 | 11/1984 | Ghaem-Maghami | 358/139 |
| 4,489,349 | 12/1984 | Okada | 358/168 |
| 4,557,599 | 12/1985 | Zimring | 356/243 |
| 4,568,975 | 2/1986 | Harshbarger | 358/139 |
| 4,569,079 | 2/1986 | Yeshida | 358/160 |
| 4,628,362 | 12/1986 | Waehner | 358/168 |
| 4,731,865 | 3/1988 | Sievenpiper | 358/168 |

FOREIGN PATENT DOCUMENTS

| | | | |
|---|---|---|---|
| 2716212 | 10/1978 | Fed. Rep. of Germany | 358/168 |
| 144614 | 12/1978 | Japan | 358/168 |

OTHER PUBLICATIONS

Article "Video-Level Adjustment for Optical Scanners", R. D. Keillor, et al., Aug. 1970, IBM Technical Disclosure Bulletin, vol. 13, No. 3, pp. 697-698.

Primary Examiner—Tommy P. Chin
Attorney, Agent, or Firm—Quarles & Brady

[57] ABSTRACT

In a video machine vision system, an apparatus compensates for varying light levels by defining a portion of the video image. A circuit is provided to measure the luminance of the video signal for the portion of the image and use that luminance to set a threshold level. The threshold level is employed in processing the image. As lighting conditions vary the luminance is re-measured causing a proportional variation in the threshold.

13 Claims, 5 Drawing Sheets

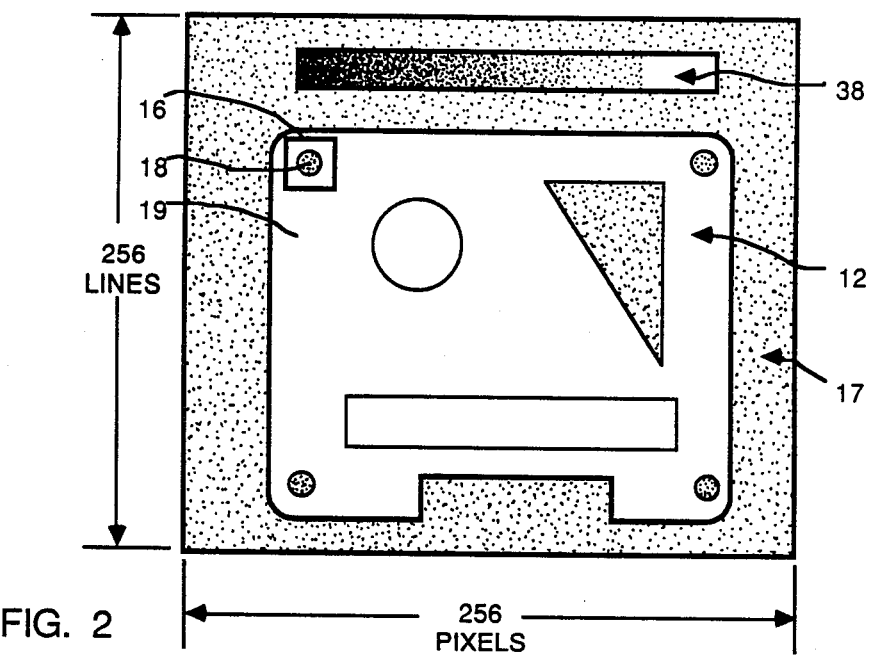
FIG. 2
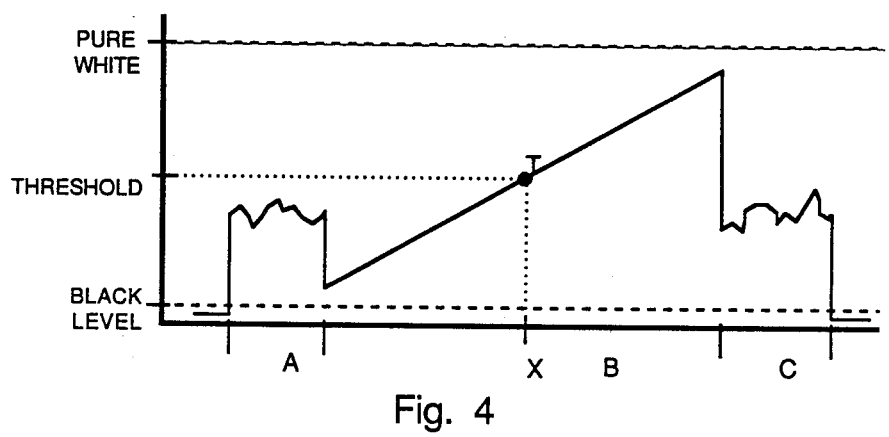
Fig. 4
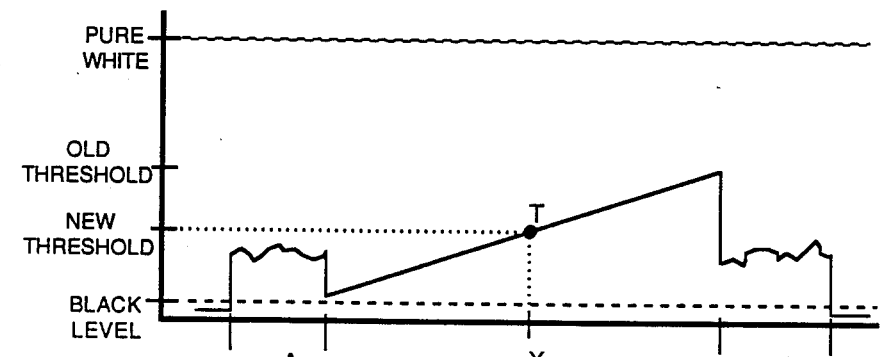
THRESHOLD   Fig. 5

MACHINE VISION SYSTEM WITH ILLUMINATION VARIATION COMPENSATION

The present invention relates to video processing systems which evaluate objects being fabricated by automated manufacturing equipment, and more particularly to such video systems which automatically compensate for variations in the illumination of the objects.

BACKGROUND OF THE INVENTION

As automated assembly equipment and robots become more sophisticated, it is desirable to add the sense of vision to such devices. This feature would enable the manufacturing equipment to locate the position of the object being fabricated as well as inspect the object for the presence and the proper location of various components.

Present vision systems use a video camera to create an electronic image of the object. A technique that is often employed to detect the features of the object relies on the contrast between various portions of the image. For example if a brightly lit object is placed in front of a relatively dark background, the shape of the object may be determined by detecting points of sharp brightness contrast in the video image. Similarly the size, shape and position of holes through the object may be determined. To carry out this technique the brightness or luminance of each picture element (pixel) in the image is compared to a predetermined threshold. Those pixels falling on one side or the other of the threshold represent a given feature of the object.

A problem encountered with this approach is that variation of the object's overall illumination can change the relationship of the feature's brightness to the preset threshold. If the overall illumination changes significantly a feature may no longer be brighter than the given threshold value, for example. In some applications the illumination can be tightly controlled. However, in object recognition systems used in an industrial environment, the amount of light falling on the objects being sensed may vary widely. Other objects passing nearby may partially block some of the illumination and various manufacturing processes such as arc welding may increase the light levels.

In television broadcast situations where the light levels cannot be closely regulated, such as outdoor broadcasts, a video engineer continuously monitors and normalizes the video levels from the various cameras. In an automated vision system it is self defeating to provide a human operator to continuously monitor the video signal and compensate for variations in the illumination of the object.

SUMMARY OF THE INVENTION

A video image processing system, such as for object recognition and inspection, includes a circuit for compensating for variation in the illumination of the object. A camera produces a video signal representing the image of the object to be studied. An apparatus is provided for measuring the luminance or brightness of a portion of the video image which is likely to have a constant luminance under a constant level of illumination. That is, it is unlikely that portion of the image will change over time such as by having various objects positioned at that portion from time to time.

The brightness measured at a first point in time defines a reference luminance level which is then used to define a luminance threshold. This luminance threshold controls a processing means for the video signal. As the illumination of objects in the camera's field of view changes, the variation in the luminance of the video signal produces a proportional adjustment of the threshold.

The present invention eliminates the effects of changes of the light level striking the object during the inspection process. In essence it normalizes the effects of the lighting environment so that two objects may be compared at different points in time without different lighting conditions affecting the comparison.

BRIEF DESCRIPTION OF THE DRAWINGS

FIG. 2 is a representation of the video image produced by the system of FIG. 1 for one embodiment of the present invention;

FIGS. 4 and 5 depict a video waveform for a horizontal line of the image shown in FIG. 2;

DETAILED DESCRIPTION OF THE PRESENT INVENTION

Figure 1:
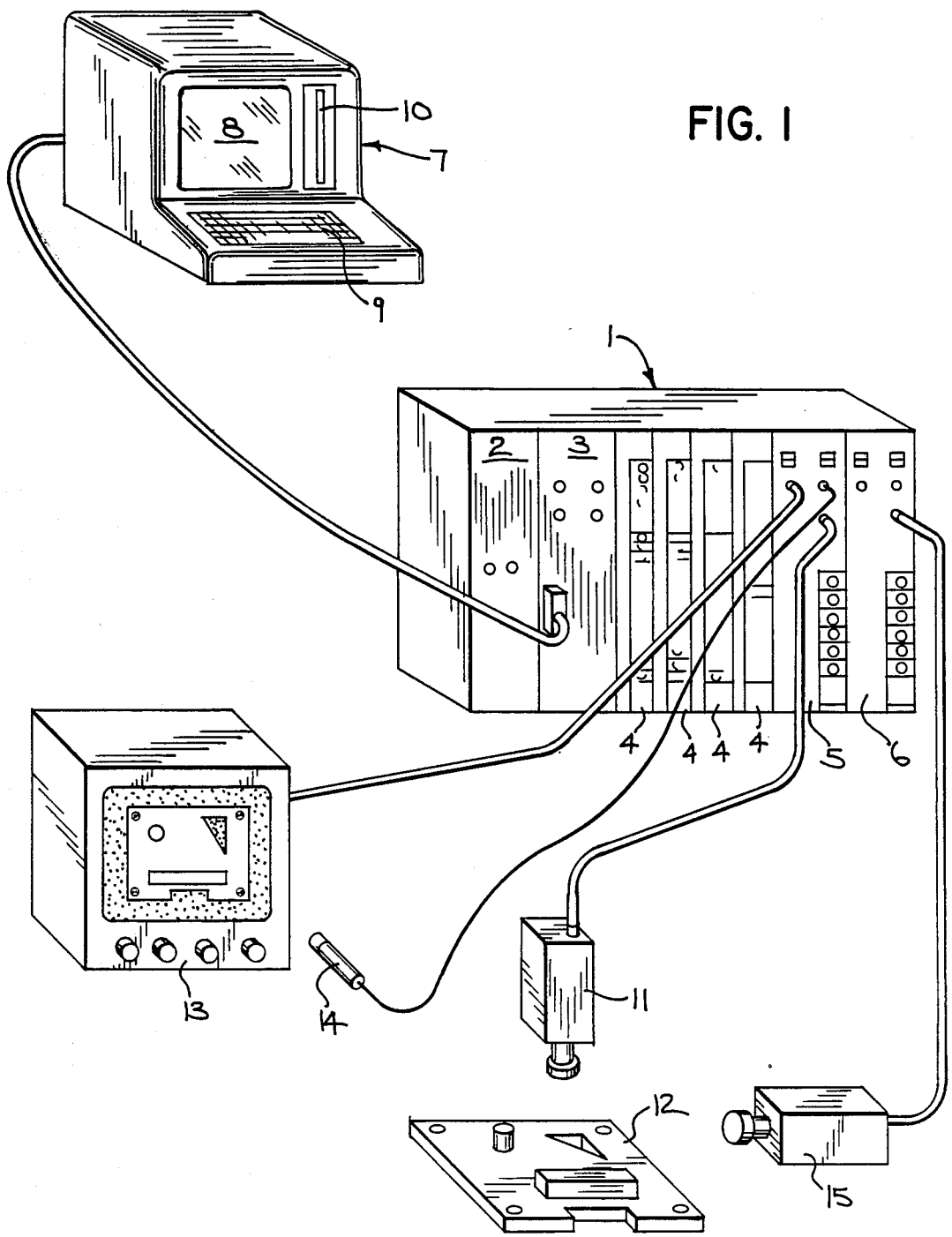
FIG. 1 is a pictorial representation of a programmable controller including a vision input module according to the present invention.

With initial reference to FIG. 1, a programmable controller in which the present invention may be used is housed in a rack 1 which includes a series of slots that receive various modules 2-6. These modules connect to a mother board which extends along the back surface of the rack 1 to provide a backplane. The physical construction of the rack is disclosed in U.S. Pat. No. 4,151,580. The modules include a power supply module 2 and a processor module 3. The processor module 3 is connected by a cable to a programming terminal 7 which includes a keyboard 9 through which the user may program the processor module 3 or monitor its operation. Alphanumeric data as well as ladder diagram representations of equipment control programs are produced on a CRT display 8, and programs and data may be stored on a floppy disk which is received in a disk drive unit 10. For a more detailed description of an programmable controller of this type, reference is made to U.S. Pat. No. 4,442,504.

Several of the modules 4–6 in rack 1 perform input/output (I/O) functions connecting the programmable controller system to the controlled equipment. For example, the system in FIG. 1 has four conventional electrical input/output modules 4 and two novel vision input modules 5 and 6. The I/O modules 4 take many forms and may include, for example, d.c. inputs or outputs, a.c. inputs or outputs, analog inputs or outputs, and/or open and closed loop positioning modules.

The first vision input module 5 connects via a cable to a video camera 11 which is aimed at a workpiece 12 from above. Although the present invention will be described in terms of a black and white video image and, therefore, employs a black and white video camera 11, the basic concepts of the present invention are equally applicable to processing systems which utilize a color video image. The workpiece 12 may be carried under the camera 11 by an assembly line conveyor (not shown). The first video input module 5 produces a video image of the workpiece which is displayed on the cathode ray tube of a monitor 13 connected to that module. Light pen 14 is used to input data by selecting symbols displayed on monitor 13 in a conventional manner.

A second vision input module 6 has another camera 15 connected to it, which is located to view the side of the workpiece 12. Although the second vision input module 6 provides terminals for a video monitor and light pen neither one is connected to it. These devices typically are only necessary in the set up phase during which the various features to be sensed and the areas within the image at which the sensing will occur are defined.

The video input modules 5 and 6 process the images from their respective cameras 11 and 15 and derive data regarding the features of the object selected for sensing. These data are then made available to the processor module 3 via the backplane of rack 1. The processor module 3 uses these sensed data to evaluate the workpiece 12 and control various manufacturing steps that are performed on the workpiece.

Figure 3:
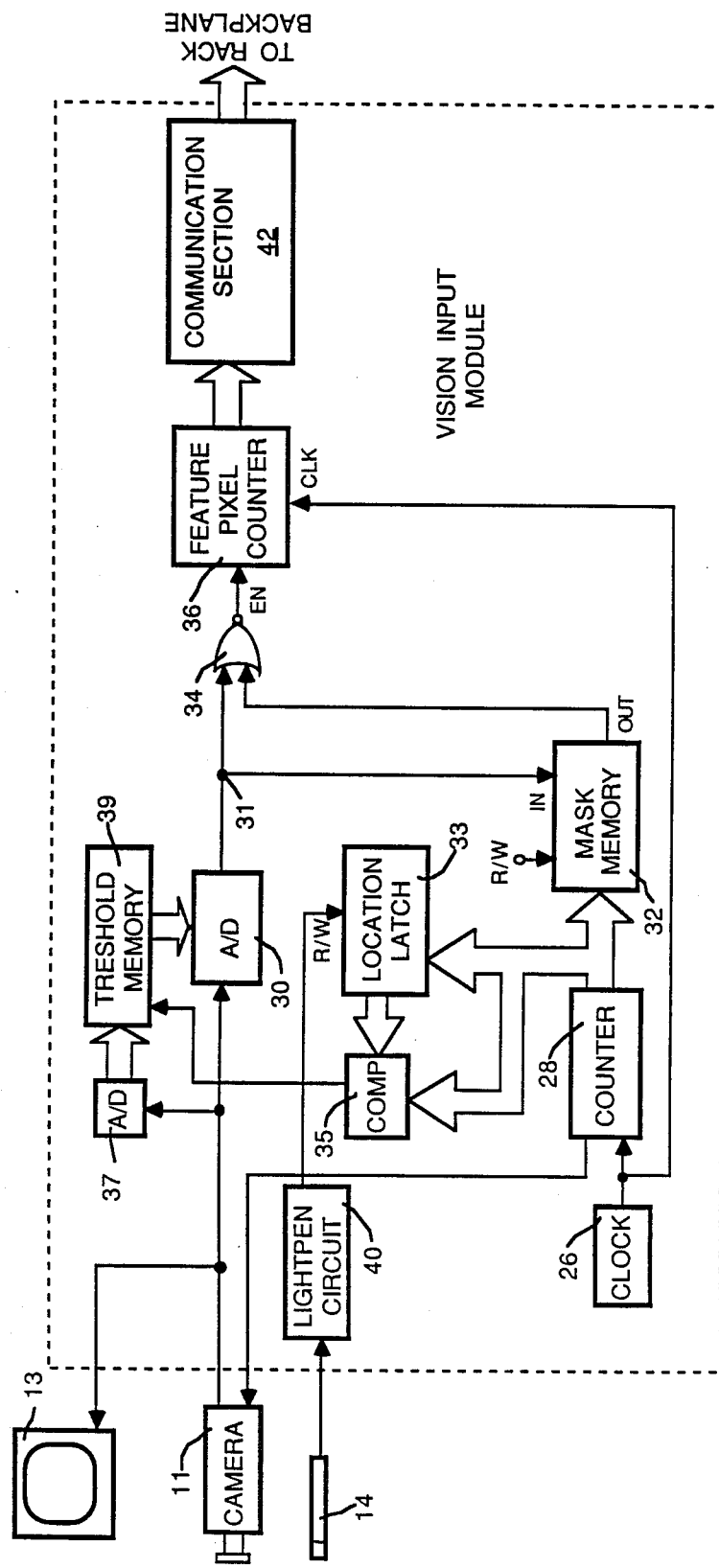
FIG. 3 is a schematic block diagram of the video processing circuitry for the one embodiment of the present invention.

One embodiment of the video processing circuitry for the vision input modules 5 and 6 is shown in FIG. 3. A clock 26 generates a pulsed signal at the picture element (pixel) rate of the video signal. This pulsed clock signal is sent to counter 28 which generates conventional horizontal and vertical synchronization signals for the video camera 11 and a count of each pixel within the video image. This count is fed to the address input of a mask memory 32 and the data input of a location latch 33. The mask memory 32 has one storage location for each pixel in the video image which in the case of the 256×256 pixel image is 65,536 storage locations. The location latch 33 has a single storage location capable of storing the digital word from the counter 28 when the latch is enabled by a write signal on its read/write R/W input. The R/W input to the location latch 33 is connected to the output of a light pen circuit 40 which is in turn connected to light pen 14. The counter 28 is also connected to an input of a comparator 35 which compares the pixel count with the contents of the location latch 33. When the two inputs to the comparator 35 are equal in value, a high level output signal is sent to the write enable input of threshold memory 39.

The video output of camera 11 is coupled to two analog to digital (A/D) converters 30 and 37, as well as to the monitor 13 (FIG. 1). The first analog to digital converter 37 produces a multi-bit digital number representing the luminance of each pixel of the video signal from camera 11. This digital number is coupled to the data input of threshold memory 39 which also receives a write enable signal from the output of the comparator 35. The threshold memory 39 has one location for storing the output from A/D converter 37 for one pixel. When an enabling signal pulse from the comparator 35 is applied to the threshold memory 39, the output from the A/D converter 37 is stored in the threshold memory 39. In the absence of such an enabling pulse, the threshold memory 39 is in a state where the stored data is applied to its data output. The data output from the threshold memory 39 is coupled to the digitizing reference input of second analog to digital converter 30.

The second analog to digital converter 30 produces a single output bit for each pixel of the video signal from camera 11. The value of the output bit is determined by a comparison of the camera signal luminance to the luminance value stored in the threshold memory 39. If the camera signal luminance is above the stored threshold value, the A/D converter 30 produces a high logic level at its output but, if the luminance is below the threshold value, a low logic level is produced. The output of the second A/D converter 30 is coupled to the data input of mask memory 32 and to one input of a NOR gate 34, the other input of which is connected to the output of the mask memory 32.

The output of NOR gate 34 is coupled to the enable input of a feature pixel counter 36 which also receives the pixel rate signal from clock 26 as a clocking signal. When the feature pixel counter 36 is enabled, it counts the pulses of the signal from clock 26. The contents of the feature pixel counter 36 are coupled to a conventional communication section 42 which interfaces the vision input module 5 to the backplane of the rack 1. The communication section 42 transmits the sensed data to the processor module 3 when requested.

With reference to FIG. 2, the image of the workpiece 12 picked up by the video camera 11 and displayed on monitor 13 consists of 256 scan lines each having 256 pixels. This permits the image information to be stored in a memory having 65,536 (64K) storage locations. The video image frames may consist of two interlaced fields, however, for simplicity of explanation a non-interlaced image will be described. As shown, the workpiece 12 is imaged against a dark background 17 to provide a high level of contrast between the workpiece 12 and its background which greatly enhances the image processing.

For illustrative purposes, the image depicted in FIG. 2 contains indicia representing a user defined sensor window 16 for processing the video signal. Various characteristics of the pixels within this sensor window 16 are tested and data regarding them are sent to the processor module 3. For example, a square sensor window 16 may be positioned to enclose a circular aperture 18 extending through the workpiece 12. The dark background 17 is visible through the aperture 18 so that it appears in sharp contrast to the brightly lit top surface 19 of the workpiece. The vision input module 5 measures the relative size of the aperture 18 by counting the number of dark picture elements within the sensor window 16.

Prior to the processing of any images by the first embodiment of the vision input module shown in FIG. 3, one or more sensor windows must be defined. The vision input modules 5 and 6 use a technique for designating the windows similar to that described in U.S. Pat. No. 4,569,079 entitled "Image Data Masking Apparatus." In this technique a sensor window is defined by creating a physical mask which contains an image of the window. For example, the mask for the sensor window 16 in FIG. 2 may be drawn as a black square on a white background. The mask is then placed before camera 11 which scans the mask producing a monochrome video image of it. The mask image from camera 11 is digitized by second analog to digital converter 30 to produce a single bit for each pixel indicating whether the pixel is black or white. The second analog to digital converter 30 produces a high logic level (one) output for pixels having a luminance above a given reference threshold level stored in memory 39 and a low logic level (zero) for pixels having a vision input value below the converter threshold. A switch on the front panel of the vision input module applies a write enable voltage to the R/W input of the mask memory 32 causing this digitized version of the mask image to be stored in the mask memory. The dark area of the mask in the image is represented by a low level bit in the corresponding memory locations. A number of sensing windows may be defined by providing a plurality of memories 32, NOR gates 34 and processing circuits 36.

Once the mask image or images have been stored the vision module 5 is ready for operation. The workpiece 12 is placed before the video camera 11 as shown in FIG. 1. The signal from the camera is digitized to produce one bit representing the luminance of each pixel. The digitized real time video of the workpiece 12 is sent from the second analog to digital converter 30 to one input of NOR gate 34. The other input of the NOR gate 34 is coupled to the output of the mask memory 32. As each digitized pixel of the workpiece image is fed to NOR gate 34, the corresponding digitized pixel of the mask image stored in memory 32 is also fed to the gate 34. Because the sensor window 16 is represented by a dark area in the mask image and the aperture 18 is also a dark area of the workpiece image, both inputs to NOR gate 34 will be low at the coincidence of the video signals for these areas thereby producing a high output. Therefore, the NOR gate 34 will produce a high output level for each pixel of the aperture 18. This high NOR gate output enables the counter 36 to tabulate the number of aperture pixels.

At the end of the video frame, the value in the feature pixel counter 36 is transferred to the communication section 42 where it is stored in a buffer memory. When the processor module 3 needs the feature pixel count, it accesses the video input module 5 over the backplane and requests that the count be transferred to it. In response to the request, the communication section 42 sends the data regarding the sensed feature over the backplane of rack 1 to the processor module 3.

As noted above, a variation in the overall lighting conditions affects whether the pixels for the selected features of the object still have the same relationship to the converter threshold stored in memory 39. For example, if the lighting of workpiece 12 decreases significantly, the luminance of surface 19 and aperture 18 will both be below the converter's threshold making the aperture indistinguishable from the object surface. In this case the second A/D converter 30 produces low level bits for the pixels of both the surface 19 and the aperture 18.

To compensate for the effects of overall lighting variation, the first embodiment employs a grey scale chart 38 as an illumination reference. This chart 38 is shown in the video image depicted in FIG. 2. The chart 38 is placed within the field of view of camera 11 where it will not interfere with the movement of workpieces 12 under the camera by a conveyor. For example, the grey scale chart 38 can be attached to the fixture holding the workpieces 12 or attached to a fixed portion of the workpiece conveyor system so that a chart will always be present when a workpiece is before the camera 11. In addition, the chart 38 is maintained at a relatively fixed position within the video image so that a predetermined horizontal line of the video signal will always scan the chart.

FIG. 4 shows a typical luminance waveform of the video signal for a horizontal line that scans across the grey scale 38. The vertical axis of the waveform represents the amplitude of the video signal with the higher amplitudes corresponding to brighter portions of the image. The black level is denoted by the lower horizontal dashed line and the pure white level denoted by the upper dashed horizontal line. The horizontal axis shows distance along the horizontal scan line with a first portion A representing the background of the image on the left side of the grey scale chart 38. The portion B represents video signal for the grey scale chart image which extends from black to white, and portion C represents that portion of the background to the right of the grey scale chart 38.

During the initial set up phase of the vision input module 5, a point along the grey scale chart 38 is selected by the operator as representing the luminance threshold for the video processing. This threshold is selected by placing the light pen 14 (FIG. 3) over the point on the grey scale chart image on monitor 13 which has the appropriate luminance level. The operator then momentarily presses a button on the light pen signalling the light pen circuit 40 that a selection has been made. The light pen 14 produces an active output signal when the electron beam strikes the location on the monitor's cathode ray tube where the selected point on the grey scale chart is displayed. The light pen circuit 40 responds to this active output signal by placing the location latch 33 in the write mode which stores the pixel count from counter 28 for the selected location on the grey scale image. This location becomes a luminance reference point which is designated by the X on the horizontal video line waveform illustrated in FIG. 4.

The luminance at the selected reference point X defines the threshold for the digitizing the video signal by the second A/D converter 30. During the next video frame from camera 11, when the pixel count from counter 28 equals the pixel count for the luminance reference point X stored in location latch 33, comparator 35 will produce an enabling pulse to threshold memory 39. This causes the threshold memory 39 to store the digitized luminance value from the first analog to digital converter 37 for the pixel at the reference point X along the grey scale chart 38. By placing the grey scale chart at the top of the video image, the threshold value may be updated at the beginning of each scan of the image. Alternatively, the threshold in memory 39 can be updated on a less frequent basis.

Once the value from the first analog to digital converter 37 is stored, the threshold memory 39 is placed in the read state. In this state the contents of the threshold memory 39 are applied to the second A/D converter 30. The threshold memory contents are used by the second A/D converter 30 as a luminance reference level for digitizing the video signal from the camera 11. If the camera signal luminance is above the level stored in the threshold memory 39, the A/D converter 30 produces a high logic level at its output, but if the luminance is below the stored level, a low logic level is produced. The output from the second A/D converter 30 represents the binary luminance of each pixel of the video image which is used by NOR gate 34 and counter 36 to analyze a feature of the image.

If the illumination of the workpiece 12 and the grey scale chart 38 should vary, the amplitude of the video signal for the horizontal video line scanning through the grey scale chart 38 will either increase or decrease in proportion to the change in the illumination. For example, in FIG. 5 a dramatic decrease in the illumination of the video scene is depicted in the video waveform. The brightest portion of the image at the peak of the grey scale ramp in portion B is approximately one-half the value of the FIG. 4 waveform peak.

Although the amplitude of the luminance signal has decreased dramatically, the position of the grey scale chart image along the horizontal scan line has remained constant. The luminance at the reference point (X) along the scan line still has the same relative relationship to the luminance of other parts of the image and has decreased in proportion the overall decrease in luminance. Therefore the threshold value as defined at point T in the video signal also has the same relative value with respect to other parts of the video signal.

By periodically determining the luminance amplitude at reference point X and storing the amplitude in threshold memory 39, the vision input module 5 adjusts the conversion threshold for variations in the overall illumination of workpiece 12. The threshold is now defined in terms of a reference point along the grey scale chart image as opposed to an absolute luminance value. The luminance threshold value is produced by measuring the luminance level of the video signal at the reference point. This provides a dynamic threshold value for processing the video image.

Figure 6:
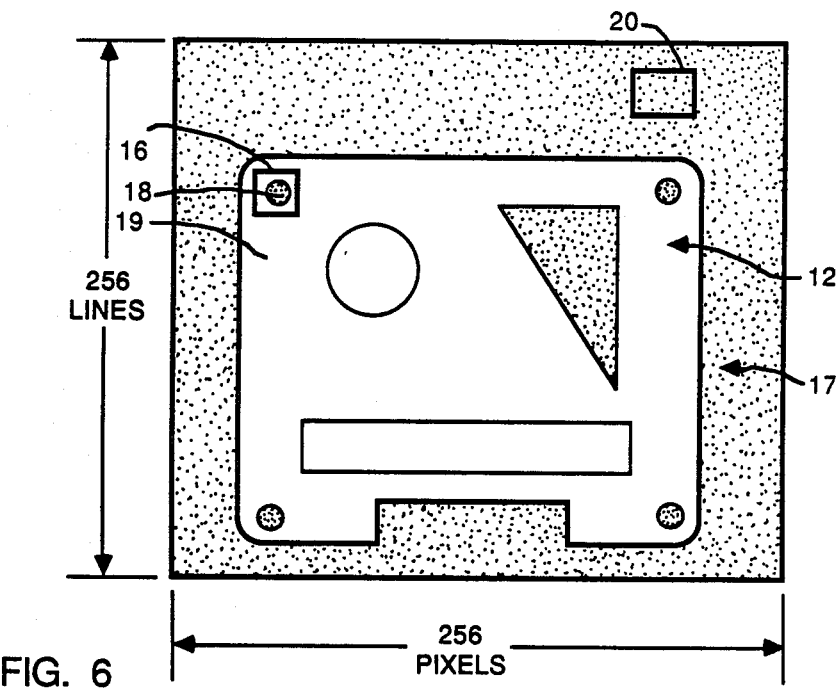
FIG. 6 is a representation of the video image for another embodiment of the present invention.

The video image for another embodiment of the present invention is shown in FIG. 6. The video image represented is similar to that of FIG. 2, except that the grey scale chart 38 is not required. Instead an illumination reference window 20 has been defined in the same manner as feature sensing window 16 is designated. For example, a separate sensing window image mask may be stored in a memory specifying the size, shape and location of the illumination window 20. The illumination window 20 is positioned to coincide with a portion of the workpiece image that does not vary as different objects are placed before camera 11. For example, a part of the workpiece fixture or the background is typically used. Unlike other sensor windows, the pixels within the illumination window 20 are not counted, but rather the average luminance of these pixels is determined. This average luminance can either be used directly as the conversion threshold or preferably multiplied by a constant to derive the threshold value as will be described below.

Figure 7:
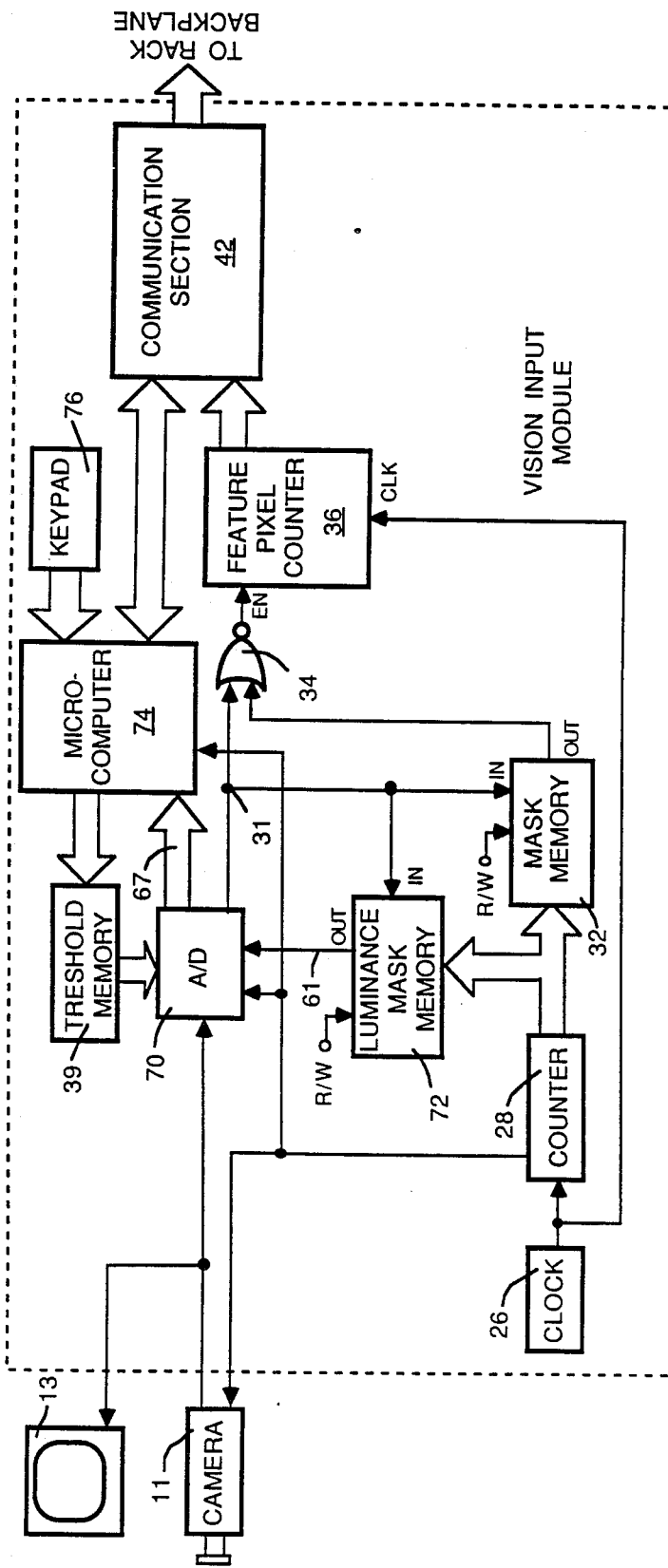
FIG. 7 is a schematic block diagram of the video processing circuit for the other embodiment of the present invention.

A block diagram of the circuit for the second embodiment of the present invention is shown in FIG. 7. It is similar to the embodiment in FIG. 3 in that a clock 26 generates a signal at the pixel rate which is coupled to counter 28 to produce the synchronization signals for camera 11 and a digital pixel count. The digital pixel count is fed to a feature mask memory 32 whose output is coupled to NOR gate 34. However, the output of counter 28 is also coupled to a luminance mask memory 72 for storing the mask for illumination window 20. The feature and illumination masks are separately loaded in the respective memories 32 and 72 in a manner similar to that described above with respect to the feature mask in the first embodiment.

Figure 8:
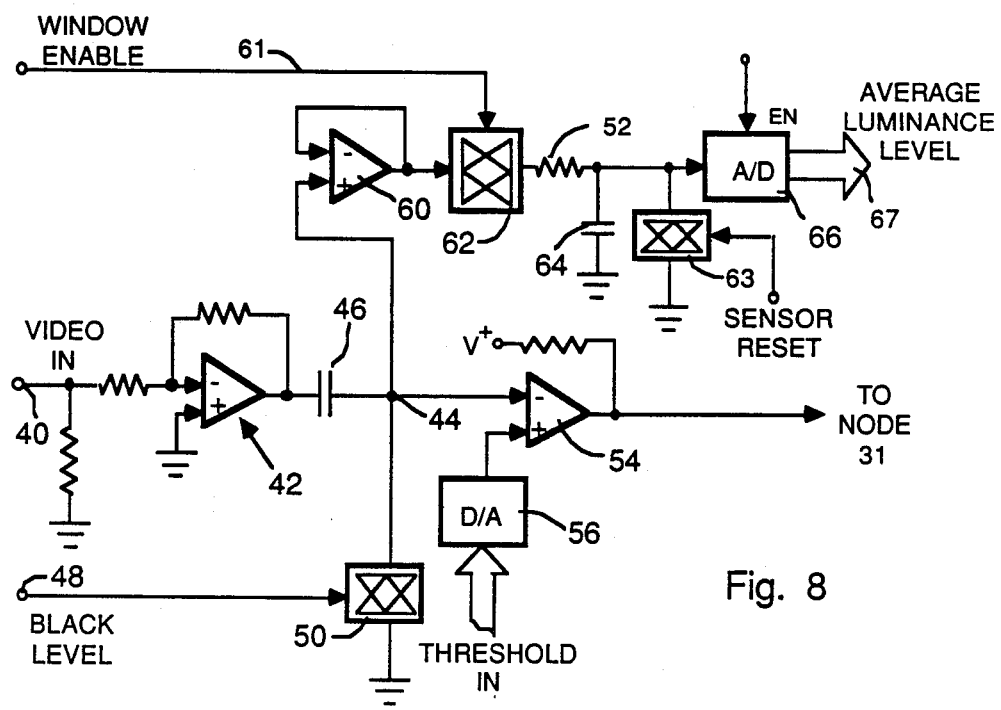
FIG. 8 is a schematic diagram of the analog to digital converter shown in the embodiment in FIG. 7.

The video output from camera 11 is fed to an analog to digital converter 70 which not only produces a binary representation of the video signal but also averages the luminance of the pixels within illumination window 20. The details of the analog to digital converter 70 are shown in FIG. 8. The video signal from camera 11 is applied to input terminal 40 where it is coupled to a video amplifier 42. The output of the video amplifier 42 is coupled to node 44 by a d.c. blocking capacitor 46. A conventional black level reference signal derived from the video synchronization signals is applied to input terminal 48 of a d.c. restoration transmission gate 50. When restoration gate 50 is enabled, node 44 is clamped to ground potential. This serves to restore the d.c. level of the signal at node 44 during the horizontal retrace interval of the video signal.

The node 44 is connected to the inverting input of a differential amplifier 54 and the non-inverting input of differential amplifier 54 is connected to a threshold voltage reference source. This voltage reference source consists of a digital to analog converter 56 whose digital input is connected to the output of threshold memory 39. The output of the differential amplifier 54 provides the digitized video output of the analog to digital converter 70 which is coupled to node 31 in FIG. 7. The portion of the converter 70 thus described could also be used as the second converter 30 in FIG. 2.

The remainder of the circuit in FIG. 8 is unique to the converter 70 of the second embodiment. The video signal at node 44 is also connected to a circuit which determines the average luminance of the pixels within the illumination window 20. The video signal is fed to a negative feedback mplifier 60 whose output is connected to the signal input of a second transmission gate 62. The control terminal of second transmission gate 62 is connected to the output of the luminance mask memory 72 via line 61. The output from luminance mask memory 72 provides a luminance window enable signal which causes transmission gate 62 to become conductive during the portion of the video signal that corresponds to the illumination window 20. The transmission gate 62 output is coupled via resistor 52 to the input of A/D converter 66. A capacitor 64 couples the input of A/D converter 66 to ground. The combination of the resistor 52 and capacitor 64 form an integrator which averages the luminance of the pixels within the sensor window 20. The averaged luminance is temporarily stored by capacitor 64. The values of resistor 52 and capacitor 64 depend on the size of the illumination window 20 and therefore it may be desirable to restrict the size of the window to a predetermined number of pixels. A third transmission gate 63 is connected in parallel with capacitor 64 to remove the charge after it has been processed by an analog to digital converter 66.

Periodically, the vision input module 5 measures the average illumination in the window 20 by enabling analog to digital converter 66 to produce a multi-bit digital number representing the sensed video luminance. The A/D converter 66 may be enabled by the vertical synchronization signal from counter 28. This synchronization signal is then coupled to gate 63 causing the removal of the charge on capacitor 64. The digital luminance value from A/D converter 66 is stored in the memory of the vision input module microcomputer 74 (FIG. 7).

The microcomputer 74 multiplies the measured average luminance by a constant to produce the new conversion threshold value which is stored in memory 39. The constant is selected by the operator during the set up phase of the vision input module 5. This number is entered into the memory of the microcomputer 74 via the keypad 76. For example, if the operator desires to set the threshold value at fifty percent of the luminance of window 20, the entered constant is chosen so that the product from the multiplication will be half the measured luminance from the analog to digital converter 70. Similarly, a constant can be chosen which produces a threshold value that is greater than the measured luminance. The constant may be empirically adjusted during the set up phase until a proper operation of the feature pixel counter 36 is achieved. By using the multiplication process to derive the threshold value for memory 39, the average luminance of the illumination window 20 does not have to be equal to the desired threshold value. The illumination window 20 may therefore be positioned almost anywhere in the image.

A change in the overall illumination of the workpiece 12 will produce a corresponding variation in the average illumination of the pixels in window 20. If the overall illumination decreases by ten percent the average luminance of window 20 also will decrease by ten percent. The product of the decreased average illumination and stored constant will produce a proportional change in the value stored in threshold memory 39. Thus, the threshold tracks the changes in overall illumination. The second embodiment which averages the luminance of several pixels has greater immunity to noise and image defects than the first embodiment which evaluates a single pixel.

The present invention provides a mechanism by which the vision input module dynamically adjusts for variations in illumination each time that it is measuring the characteristics of the workpiece. Based upon measured variations in illumination, the luminance threshold level used to digitize the video signal is adjusted to compensate for such variations. Both of the embodiments described herein designate a portion of the image at which the illumination of the workpiece is sensed to determine the magnitude of any illumination change. The amount of change in the illumination is, as reflected in a variation in the video luminance, employed to vary the luminance threshold of the image processing circuit so that thresholding will always occur at the same relative luminance level of the video signal.

We claim:

1. A programmable controller for operating a machine, said controller including a vision input system comprising:
   means for receiving a video signal representing a video image of an object to be processed by the machine;
   means for measuring the luminance of the video signal for a portion of said video image;
   means, responsive to said means for measuring, for establishing a luminance threshold;
   means for digitizing the video image by employing the luminance threshold; and
   means for analyzing characteristics of the digitized image to generate data for use in operating the machine.

2. The system as in claim 1 wherein the video image includes a grey scale reference chart and the portion of the video image includes part of said grey scale reference chart.

3. The system as in claim 1 wherein the portion of the video image consists of a plurality of picture elements.

4. The system as in claim 3 wherein said means for measuring includes means for averaging the luminance of the picture elements in the portion of the video image.

5. The apparatus as recited in claim 4 wherein said means for establishing said luminance threshold includes means for multiplying the average luminance by a predetermined number.

6. A method for compensating for effects of changing lighting conditions on a video image of a machine vision system comprising:
   (a) defining a portion of the video image;
   (b) measuring the luminance of a video signal for the defined portion of the video image;
   (c) using the measured luminance to establish a luminance threshold; and
   (d) converting the video image to a binary video image utilizing the luminance threshold as the binarization threshold.

7. The method as recited in claim 6 further comprising repeating steps a through d for a plurality of video images being processed.

8. In a video signal processing system, an apparatus compensates for effects that a temporal variation of illumination has on a video image represented by the video signal, said apparatus comprising:
   means for defining a portion of the video image;
   means for measuring the luminance of the video signal for the defined portion of the video image;
   means, responsive to said measuring means, for establishing a luminance reference level; and
   means for digitizing the video signal into a plurality of picture elements wherein each picture element is represented by a binary number, the value of the binary number being determined by the relationship of the luminance of the video signal to the luminance reference level.

9. The apparatus as in claim 8 wherein the video image includes a grey scale reference chart and the defined portion of the video image includes part of said grey scale reference chart.

10. The apparatus as in claim 8 wherein the defined portion of the video image consists of a plurality of picture elements.

11. The apparatus as in claim 10 wherein said means for measuring includes means for averaging the luminance of the picture elements in the defined portion of the video image.

12. The apparatus as in claim 11 wherein said means for averaging the luminance comprises an integrator.

13. The apparatus as recited in claim 11 wherein said means for establishing a luminance reference level includes means for multiplying the average luminance by a predetermined number.

* * * * *